(12) United States Patent
Roh

(10) Patent No.: US 7,003,034 B2
(45) Date of Patent: Feb. 21, 2006

(54) FINE GRANULARITY SCALABILITY ENCODING/DECODING APPARATUS AND METHOD

(75) Inventor: Kyu-Chan Roh, Daejeon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/659,386

(22) Filed: Sep. 11, 2003

(65) Prior Publication Data

US 2004/0101052 A1    May 27, 2004

(30) Foreign Application Priority Data

Sep. 17, 2002   (KR)   ...................... 10-2002-0056566

(51) Int. Cl.
    *H04N 7/12*        (2006.01)
(52) U.S. Cl. ............................................... 375/240.11
(58) Field of Classification Search ........... 375/240.01, 375/240.1, 240.11, 240.05, 240.19; 348/397.1, 348/398.1; 382/240
    See application file for complete search history.

(56) References Cited

U.S. PATENT DOCUMENTS

| | | | |
|---|---|---|---|
| 6,263,022 B1 * | 7/2001 | Chen et al. ............. | 375/240.03 |
| 6,480,547 B1 * | 11/2002 | Chen et al. ............. | 375/240.27 |
| 6,639,943 B1 * | 10/2003 | Radha et al. .......... | 375/240.11 |
| 6,788,740 B1 * | 9/2004 | van der Schaar et al. .. | 375/240 |
| 2002/0118743 A1 | 8/2002 | Jian ....................... | 375/240.01 |
| 2002/0181580 A1 * | 12/2002 | Van Der Schaar ..... | 375/240.01 |
| 2003/0058931 A1 * | 3/2003 | Zhang et al. .......... | 375/240.01 |
| 2003/0165331 A1 * | 9/2003 | Van Der Schaar .......... | 386/111 |
| 2003/0202579 A1 * | 10/2003 | Lin et al. ................ | 375/240.03 |
| 2003/0223643 A1 * | 12/2003 | Van Der Schaar .......... | 382/236 |

OTHER PUBLICATIONS

Li W: "Overview of Fine Granularity Scalability in MPEG-4 Video Standard" IEEE Transactions on Circuits and Systems for Video Technology, IEEE Inc. New York, US, vol. 11., No. 3, Mar. 2001, pp. 301-317, XP000994715 ISSN: 1051-8215.

Roh K-C et al: "Data partitioning and coding of DCT coefficients based on requantization for error-resilient transmission of video" Signal Processing. Image Communication, Elsevier Science Publishers, Amsterdam, NL, vol. 17, No. 8, Aug. 28, 2002, pp. 573-585, XP004378875.

Mendes L R et al: :Two-scale transmission of DCT-coded video over lossy packet networks Telecommunications Symposium, 1998. ITS' 98 Proceedings. SBT/IEEE International Sao Paulo, Brazil Aug. 9-13, 1998, New York, NY, USA, IEEE, US, Aug. 9, 1998, pp. 510-515. XP010300835.

(Continued)

*Primary Examiner*—Vu Le
(74) *Attorney, Agent, or Firm*—Fleshner & Kim, LLP

(57) ABSTRACT

A fine granularity scalability encoding/decoding apparatus includes a first quantizer for performing a DCT on a motion-compensated image and quantizing a resulting value, a second quantizer for re-quantizing the value obtained by the first quantizer, an inverse-quantizer for re-quantizing a value re-quantized by the second quantizer, and a number of subtracters. A first subtracter obtains a difference between a value of N times the re-quantized value and the inverse-quantized value. A second subtracter obtains a difference between the value quantized by the first quantizer and the value quantized by the inverse-quantizer. And, a third subtracter subtracts the output value of the first subtracter from the output value of the second subtracter. Coding efficiency is increased and a bit-rate reduction of an entire coding stream is achieved by making an enhancement layer signal and a base layer signal have the same code.

14 Claims, 5 Drawing Sheets

OTHER PUBLICATIONS

Hsu Y-F et al: "Embedded SNR scalable MPEG-2 video encoder and its associated error resilience decoding procedures" Signal Processing. Image Communication, Elsevier Science Publishers, Amsterdam, NL, vol. 14, No. 5, Mar. 1999, pp. 397-412, XP004163262 ISSN:0923-5965 the whole document.

* cited by examiner

FINE GRANULARITY SCALABILITY ENCODING/DECODING APPARATUS AND METHOD

BACKGROUND OF THE INVENTION

1. Field of the Invention

The present invention generally relates to encoding and decoding information in a communication system, and more particularly to a system and method which performs fine granularity scalability encoding/decoding of image information.

2. Background of the Related Art

In coding and transmitting an image, an MPEG-4 (Moving Pictures Expert Group-4) standard is designed to provide various picture qualities depending on the situation or performance of a receive terminal. In a related-art system, if a computing power of the terminal at the receiving end is excellent and a delivery layer (wireless, ATM, LAN or the like) is in good condition, a moving picture with high quality can be received and displayed. However, if the performance of the receiver terminal is not good or a communication line is not in good condition, a high quality moving picture cannot be received.

In order to cope with these two situations, MPEG-4 is designed to perform scalable image coding. This involves having an encoder generate a scalable bit stream at a sending end. The bit stream is then transmitted so that the receiving end can receive an image of various picture qualities (that is, from a low quality to a high quality).

If the transmission bit stream is scalable, various types of receivers can be used. A low-performance receiver can receive and display a basic quality image bit stream encoded at a base layer. A high-performance receiver can receive and display a high quality image bit stream encoded in an enhancement layer.

The scalable image coding method is roughly performed in the base layer and enhancement layer. When moving picture information of a basic quality is transmitted from the base layer of the encoder and information providing enhanced picture quality is transmitted with the basic quality moving picture information from the enhancement layer of the encoder, a decoder at the receiving side decodes the high quality image information. In a low-performance receiver, the decoder selectively decodes the received image information of the two layers according to a state of performance of the receiver terminal and the delivery layer.

That is, if the decoder in a low-performance receiver is incapable of decoding every piece of information transmitted through the delivery layer the decoder decodes only the information on the base layer, which is a minimum image quality compensation layer, and discards the information corresponding to the remaining enhancement layer. In contrast, a high-performance receiver can receive information of every layer and implement a high quality image. Thus, through scalable image coding, an image can be transmitted for decoding and display by both high-performance decoders and low-performance decoders.

In the above-mentioned scalable image coding method, image frames can be restored only when the receiving end completely receives all the bit streams from the enhancement layer. Otherwise, the corresponding image cannot be properly restored. Thus, until all the bit streams have been received after requesting their re-transmission, image restoration cannot be performed, or a transmission error concealment should be performed using an image of a previous frame.

In this latter technique, if a planned image bit stream cannot be not transmitted on a real-time basis due to an unstable delivery layer, a received image should be restored on a real-time basis using only partial image bit streams received up to a certain time point. For this purpose, MPEG-4 proposes an FGS (Fine Granular Scalability) coding method towards forming an international standard.

The FGS coding method restores a transmission image using partial bit streams received up to a certain time point if a delivery layer is not stable when scalable coding is performed. This method therefore overcomes the shortcomings of the existing scalable coding method implemented in consideration of only a stable delivery layer. The FGS coding method uses a method of transmitting image bit streams in bit plane units when the enhancement layer at the sending end transmits the image bit streams of an enhanced picture quality based on an image transmitted from the base layer.

The FGS coding method is similar to the existing scalable coding method in that when the sending end transmits a bit stream required for the enhancement layer to the receiving end, it transmits only a difference between an original image and an image transmitted from the base layer. This difference information may then be used at the receiving side to generate images and improve picture quality.

A major difference between the FGS encoding method and the existing scalable encoding method is that in the FGS encoding method, the enhancement layer divides image information to be transmitted into bit planes, transmits the most significant bit (MSB) with priority, and then transmits the less important bits consecutively by dividing them into bit planes. Accordingly, in the FGS encoding method, even though the receiving end fails to receive every bit required for restoration of an image due to a sudden change in bandwidth of the delivery layer, it can restore a received image to some extent by using bit streams received up to a certain time point.

For example, assume that image information corresponding to the value 25 is to be transmitted. The value 25 is expressed by '11001' using binary numbers, which can consist of 5 bit planes. In order to transmit the image information by bit planes, first the sending end informs the receiving end that the information to be transmitted consists of 5 bit planes. Thereafter, in the case that the bits are transmitted from the MSB to the least significant bit (LSB), when transmission of the first bit is completed, the receiving end can recognize that the received information is a value of above 16 (10000). When transmission of the second bit is completed, the receiving end can recognize that the received information is a value of above 24 (11000).

If the sending end cannot transmit a bit stream any more due to a restriction in bandwidth of the delivery layer, the receiving end can restore the information corresponding to the numeric 24 using the bit stream 11000 which has been received up to a certain time point. As a result, the received information 24 is similar to the information 25 that the sending end initially intended to transmit.

As mentioned above, the fine granularity scalability encoding method used in MPEG-4 considers a situation that a bandwidth of the delivery layer can be quickly changed any time. The construction of the basic fine granularity scalability coder will now be described with reference to FIG. 1.

FIG. 1 is a schematic block diagram of an MPEG-4 fine granularity scalability coder in accordance with the related art, which does not have a part for a DCT (Discrete Cosine Transform) calculation in the enhancement layer. The coder includes a fine granularity scalability (FGS) layer consisting of a base layer and an enhancement layer. A signal of the enhancement layer is generated by a difference value between a DCT coefficient before quantization and a signal re-constructed to be inverse-quantization.

First, for the base layer, conventional MPEG-4 encoding is used as is. In the image encoding method used for the base layer, an image data compression is performed in a spatial and temporal direction through a discrete cosine transform (DCT), quantization, motion estimation (ME), motion compensation (MC), inverse quantization ($Q^{-1}$), inverse discrete cosine transform (IDCT) or the like, and an entropy coding according to preponderance of coding generation probability is performed through a variable length coding (VLC). Finally, a base layer bit stream generated through the coding is transmitted to the delivery layer through a transmission buffer.

As illustrated, in FGS enhancement encoding of the enhancement layer, a difference between an original image and an image reproduced in the base layer is calculated by a subtracter. A bit plane shifting process, a maximum value finding process, a bit plane VLC process are then respectively performed on an error value according to the difference. This difference is a difference between an image reproduced after being coded in the base layer (that is, an image reproduced through the inverse-quantizer ($Q^{-1}$)) and the original image generated after DCT is performed.

At this time, if a block selectively having a good picture quality is required, the corresponding value should be transmitted first with priority. In this case, the bit plane shifting process can be selectively performed. The process of transmitting the corresponding value with priority because of necessity of the block with a good picture quality performed in the bit plane shifting process maybe referred to as selective enhancement.

Thereafter, in the process of finding a maximum value, the number of maximum bit planes for transmitting a corresponding image frame is obtained. Then, in the bit plane VLC process, 64 DCT coefficients (bit of a corresponding bit plane of the DCT coefficient is 0 or 1) obtained by the block unit of the bit plane are put into one matrix in zigzag scan order, and each matrix is run-length coded according to a VLC table.

FIG. 2 shows the structure of a related-art decoder terminal (that is, the receiving end) of the FGS encoder used in the MPEG-4 international standard. Decoding of the transmission bit stream received from the delivery layer is performed separately in the base layer and in the enhancement layer in reverse order to that of the encoder.

In the base layer of the decoder, the MPEG-4 image decoding method is used as is. First, when a bit stream is input into the base layer, the bit stream undergoes a variable length decoding (VLD), inverse quantization, and inverse discrete cosine transforming. Then, the inverse discrete cosine transformed value and a motion-compensated value are added, and the obtained values are clipped into the range of 0~255, thereby restoring an original image of the base layer.

In the enhancement layer of the FGS encoding method, decoding of a bit stream transmitted to the enhancement layer is performed in inverse order to that of the encoder. That is, first, bit-plane VLD is performed on the input enhancement bit stream. At this time, if a block with a good picture quality has been selectively transmitted, the bit plane shifting process is selectively performed. After the VLD is performed and the shifting is selectively performed on each bit plane, the obtained value is subjected to the IDCT in the block unit, thereby restoring the original image. Thereafter, the image restored in the enhancement layer is added to an image decoded in the base layer, and then the obtained values are clipped in the range of 0~255, whereby an image of an enhance picture quality is finally restored.

As mentioned above, if there is no DCT calculation in the enhancement layer of the MPEG-4 FGS encoding, the enhancement layer signal is determined by a quantization error. However, because the quantization error is calculated based on the difference between the signal prior to quantization and the value reconstructed by quantization (and thus the sign (positive (+) or negative (−)) of the enhancement layer signal is determined irrespective of the base layer), information according to the sign should be encoded together.

SUMMARY OF THE INVENTION

[1] An object of the present invention is to overcome one or more draw backs of the related-art systems and methods described above.

Another object of the present invention is to provide a fine granularity scalability encoding/decoding apparatus and method which improves coding efficiency and reduces a bit rate of an entire coding stream, by making an enhancement layer signal and a base layer signal have the same sign so as not to transmit sign information.

To achieve at least one of the above objects in whole or part, the present invention provides in accordance with one embodiment a fine granularity scalability encoding/decoding apparatus including: a first quantizer for performing a DCT on a motion-compensated image and quantizing a result value; a second quantizer for re-quantizing the value obtained by the first quantizer; an inverse-quantizer for re-quantizing a value re-quantized by the second quantizer; a first subtracter for obtaining a difference between a value of N times the re-quantized value and the inverse-quantized value; a second subtracter for obtaining a difference between the value quantized by the first quantizer and the value quantized by the inverse-quantizer; a third subtracter for subtracting an output value of the first subtracter from an output value of the second subtracter; a maximum value calculating unit for searching a maximum value from output values of the third subtracter; and a bit plane variable length coding unit for performing a variable length coding on the obtained maximum value by bit planes.

In accordance with a second embodiment, the present invention provides a fine granularity scalability encoding/decoding method including: a first quantization step of quantizing a value obtained by performing a discrete cosine transforming on a motion-compensated image; a re-quantization step of re-quantizing the quantized value; an inverse-quantization step of inverse-quantizing the re-quantized value; a first subtraction step of obtaining a difference between a value of N times the re-quantized value and the inverse-quantized value; a second quantization step of obtaining a diffrence between the first-quantized value and the inverse-quantized value; and a third quantization of subtracting the output value obtained in the first subtraction step from the output value obtained in the second subtraction step.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

In accordance with the present invention, when coding is performed in an enhancement layer at a transmitting side of a communication system, input information of the enhancement layer is determined by a quantization error of a quantizer (that is, the input information is the quantization error). Preferably, the error is based on a difference between a signal prior to re-quantization and a decision level of the re-quantizer. Compared to related-art methods, the input information of the enhancement layer does not correspond to a difference between a previous signal and the decision value. Rather, in accordance with the present invention, the difference is between a previous signal and a reconstruction level. Therefore, in performing encoding in the enhancement layer in accordance with the present invention, coding information of the enhancement layer signal can be significantly reduced.

Figure 3:
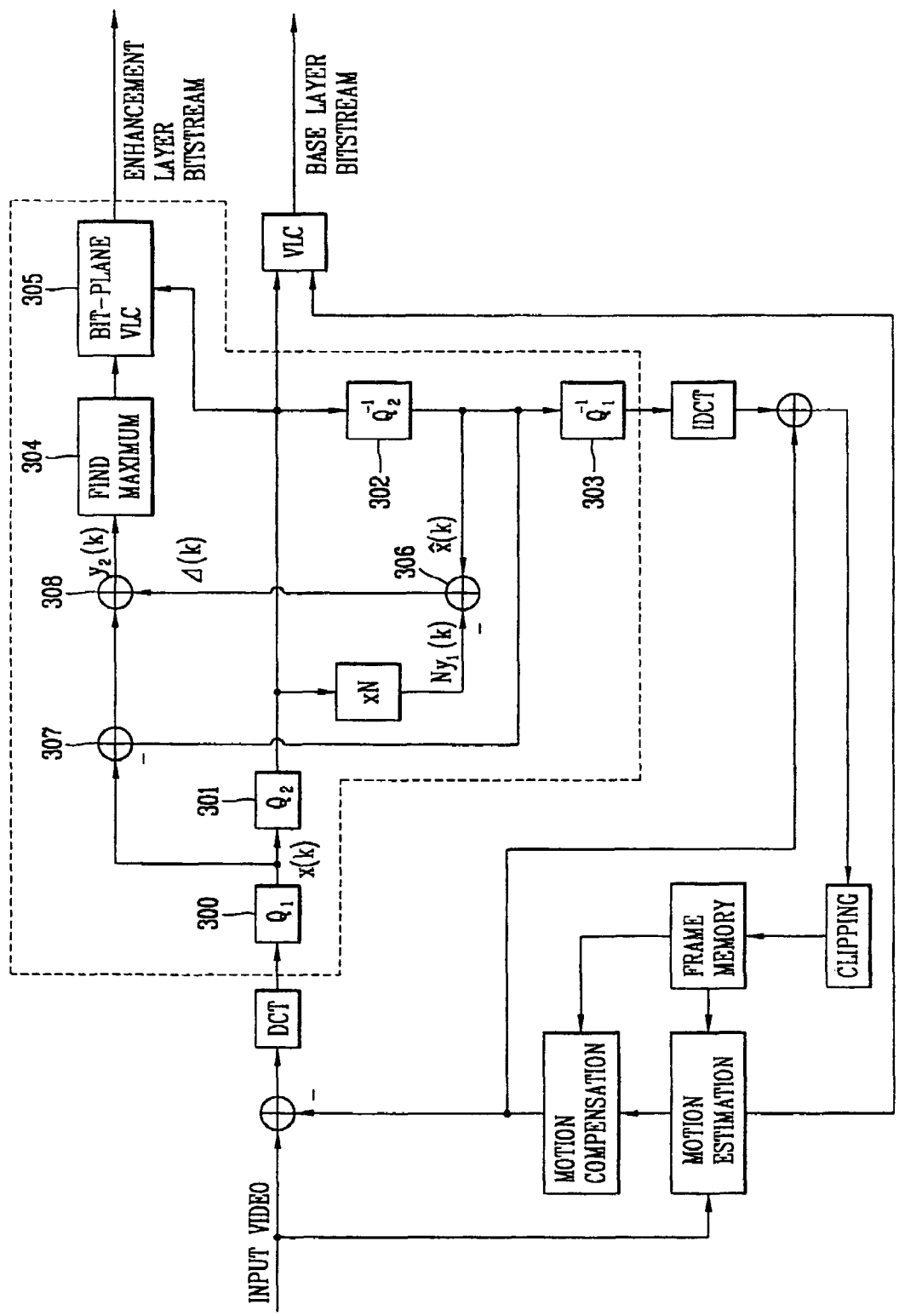
FIG. 3 is a block diagram of an FGS encoder in accordance with one embodiment of the present invention.

FIG. 3 is a block diagram of an FGS encoder in accordance with one embodiment of the present invention. The encoder includes a first quantizer 300, a second quantizer 301, an inverse quantizer 302, and a number of subtracter circuits. The first quantizer quantizes a resulting DCT value from a motion-compensated image. The second quantizer 301 re-quantizes ($Q_2^{-1}$) the value (x(k)) obtained by the first quantizer. The inverse-quantizer 302 inverse quantizes a value ($y_1(k)$) re-quantized by the second quantizer 301. A first subtracter 306 obtains a difference between a value ($Ny_1(k)$) of N times the re-quantized value ($y_1(k)$) and the inverse-quantized value ($\hat{\chi}(k)$). A second subtracter 307 obtains a difference between the value (x(k)) quantized by the first quantizer 300 and the value quantized by the inverse-quantizer. And, a third subtracter 308 subtracts the output value of the first subtracter from the output value obtained by the second subtracter. The encoder also includes a maximum value calculating unit 304 for searching a maximum value from output values of the third subtracter, and a bit plane variable length coding unit 305 for performing variable length coding on the obtained maximum value by bit planes.

The process for calculating the error from each subtracter will now be described in detail. Processes other than the error-calculating process maybe the same as in the related-art.

First, first subtracter 306 obtains a difference between the value of N times ($Ny_1(k)$) the value ($y_1(k)$) re-quantized by second quantizer 301 and the value ($\hat{\chi}(k)$) inversely quantized by inverse-quantizer 302. Then, second subtracter 307 obtains a difference between the image reproduced after being coded in the base layer (that is, the image reproduced after passing the inverse-quantizer ($Q_2^{-1}$)), and the original image having passed the first quantizer 300.

Thereafter, the third subtracter 308 obtains a difference value between the two output values calculated in the first and second subtracters.

Maximum value calculating unit 304 finds the number of maximum bit planes for transmitting a corresponding image frame from the image according to the difference value, and bit plane variable length coding unit 305 performs variable length coding on the calculated maximum value by bit planes. A coding process performed for the base layer maybe the same as in related-art.

In order not to code coding information in the encoding the enhancement layer, the fine granularity scalability (FGS) encoder calculates a quantization error from a difference between the signal prior to re-quantization and the decision level of the re-quantizer, thereby making a sign of the enhancement layer signal and a sign of the base layer signal the same to enhance coding efficiency.

Figure 4:
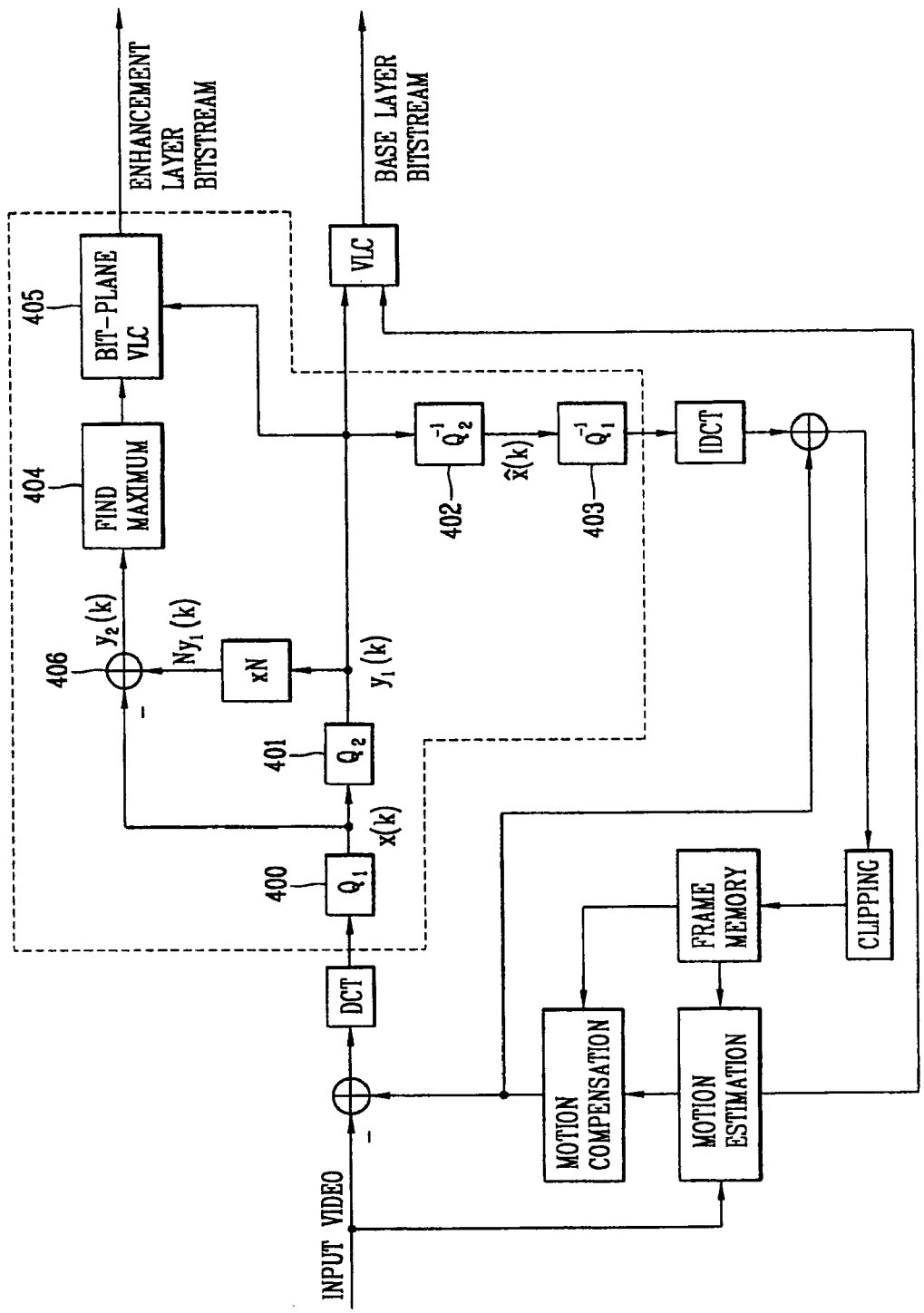
FIG. 4 is a block diagram of an FGS encoder in accordance with another embodiment of the present invention.

FIG. 4 is a block diagram of an FGS encoder in accordance with another embodiment of the present invention. The encoder includes: a first quantizer 400 ($Q_1$) for quantizing a DCT-calculated value, a second quantizer 401 ($Q_2$) for re-quantizing the value (x(k)) quantized by the first quantizer 400, an inverse-quantizer 402 ($Q_2^{-1}$) for inversely quantizing the value ($y_1(k)$) re-quantized by the second quantizer 401, and a re-inverse-quantizer 403 ($Q_1^{-1}$) for re-inversely quantizing the value ($\hat{\chi}(k)$) inversely quantized by the inverse-quantizer 402. The encoder also includes a subtracter 406 for obtaining a difference between the value (x(k)) quantized by the first quantizer 400 and a value ($Ny_1(k)$) of N times the value ($y_1(k)$) quantized by the second quantizer 401, a maximum value calculating unit 404 for performing a maximum value from values outputted from the subtracter 406, and a bit plane variable length coding unit 405 for performing a variable length coding on the calculated maximum value by bit planes.

In FIGS. 3 and 4, two consecutive quantizers ($Q_1$ and $Q_2$) are defined. And, the signal of the enhancement layer is determined by an error by the second quantizer ($Q_2$). The quantization error is completed based on a difference between the signal prior to re-quantization and the decision level of the re-quantizer, not the difference between the signal prior to quantization and the re-constructed value after inverse-quantization as is the one with the related-art. Therefore, if the sign of the enhancement layer signal and the sign of the base layer signal are identical, the signals of the enhancement layers of FIGS. 3 and 4 would be verified to be the same by the mathematical equations (1)–(6):

$$y_1(k) = \text{sgn}(x(k)) \left[ \frac{x(k)}{N} \right], \quad (1)$$

$$\text{sgn}(x) = \begin{cases} 1, & x \geq 0 \\ -1, & x < 0, \end{cases} \quad (2)$$

$$|\hat{x}(k)| = \begin{cases} 0, & \text{if } y_1(k) = 0, \\ \left\lfloor \frac{1}{2} N(2|y_1(k)|) + 1 \right\rfloor, & \text{if } y_1(k) \neq 0, N \text{ is odd}, \\ \left\lfloor \frac{1}{2} N(2|y_1(k)| + 1 \right\rfloor - 1, & \text{if } y_1(k) \neq 0, N \text{ is even}, \end{cases} \quad (3)$$

$$\hat{x}(k) = \text{sgn}(y_1(k))|\hat{x}(k)|, \quad (4)$$

$$y_2(k) = x(k) - \hat{x}(k) + \Delta(k), \ 0 \leq k \leq 63 \quad (5)$$

$$\Delta(k) = \hat{x}(k) - Ny_1(k) \quad (6)$$

Thereafter, maximum value calculating unit 44 obtains the number of maximum bit planes for transmitting a corresponding image frame from the value outputted from the subtracter. The bit plane variable length coding unit 45 performs the variable length coding process on the calculated maximum value by bit planes. A coding process of the base layer maybe the same as that of the related-art.

The encoder of FIG. 4 can achieve the same level of performance or the encoder of FIG. 3 in terms of improving the coding efficiency, by making the sign of the enhancement layer signal and the sign of the base layer signal the same. However, unlike the encoder of FIG. 3, the encoder of FIG. 4 has a simpler structure, achieved by reducing the number of subtracters. This, in term, significantly reduces complexity in its implementation. Also, because the number of memory units or components are reduced, calculation time in each unit can be reduced.

Figure 5:
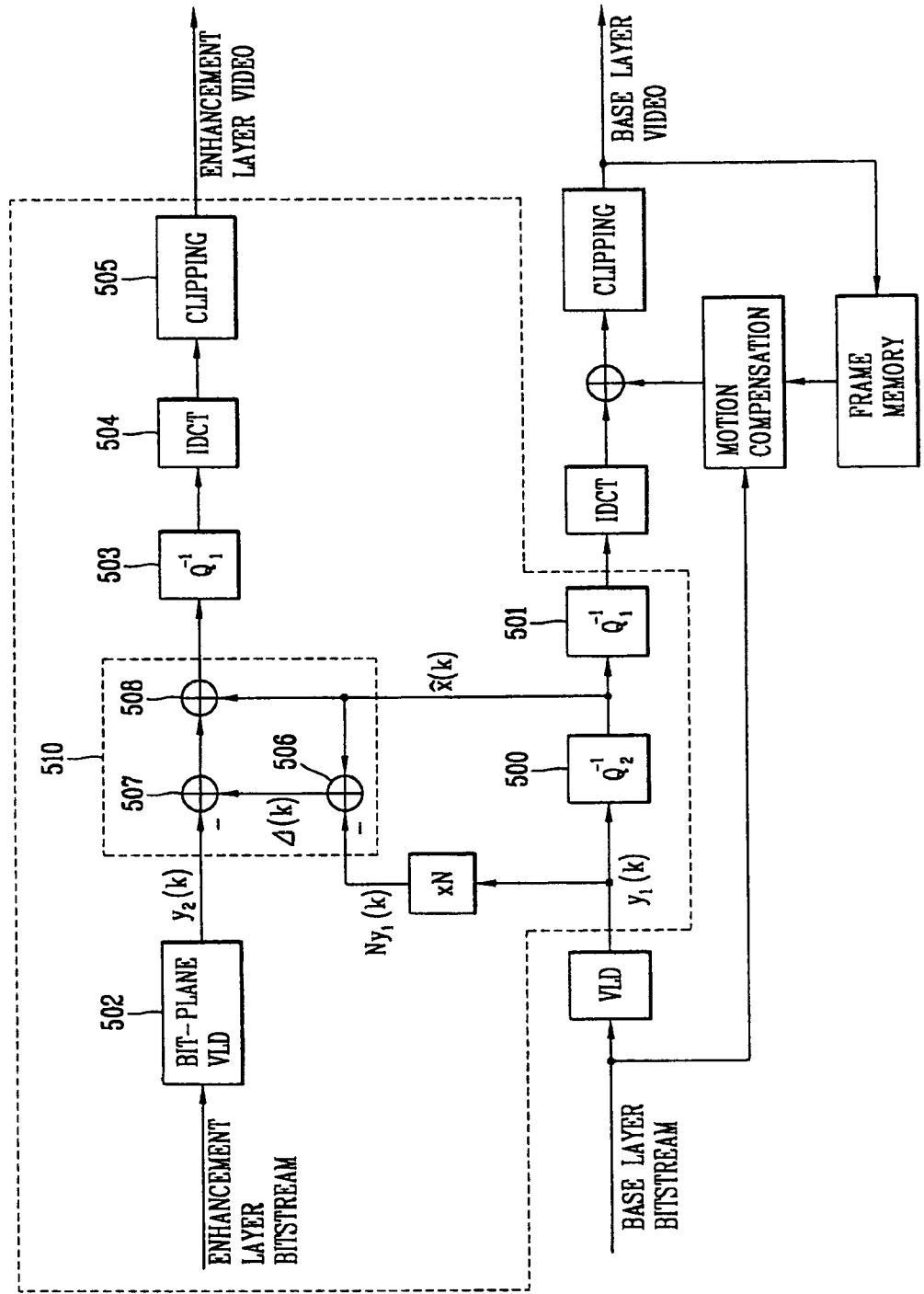
FIG. 5 is a schematic block diagram of a decoder in accordance with a preferred embodiment of the present invention.

FIG. 5 is a schematic block diagram of a decoder corresponding to the FGS encoder in accordance with a preferred embodiment of the present invention. The decoder decodes a bit stream received from the enhancement layer preferably in an inverse order to that of the encoders of FIGS. 3 and 4.

The decoder includes: a bit plane variable length decoding (VLD) unit 502 for variable-length decoding an inputted enhancement layer bit stream by bit planes, an adding/subtracting unit 510 for adding/subtracting a difference value between the variable length decoded value of each bit plane and an image reproduced in the base layer, an inverse-quantizer 503 ($Q_1^{-1}$) for inversely quantizing the added/subtracted value, an inverse discrete cosine transforming unit 504 for restoring an image transmitted from the enhancement layer by performing an inverse discrete cosine transforming (IDCT) on the inversely quantized value by block units (8×8 unit). The decoder also includes a clipping unit 505 for restoring an enhanced image by clipping the inverse discrete cosine transformed image values in the range of 0~255.

The adding/subtracting unit 510 includes a number of subtracters. A fifth subtracter 506 for obtains a difference value ($\Delta k$) between the value ($Ny_1(k)$) of N times the value ($y_1(k)$) obtained by variable length decoding the bit stream of the base layer and the value ($\hat{\chi}(k)$) obtained by the inverse-quantizer 500 which inversely quantizes the variable length decoded value ($y_1(k)$). A sixth subtracter 507 obtains a difference value between the value ($\Delta(k)$) obtained by the fifth subtracter 506 and the bit plane variable length decoded value ($y_2(k)$). And, a seventh subtracter 508 obtains a difference value between the value obtained by the sixth subtracter 507 and the value ($\hat{\chi}(k)$) inversely quantized by the inverse-quantizer 500.

In the above embodiment, operation of the decoder is explained by the construction of units in relation to an apparatus. A same operational process maybe performed or a method. The construction and operation of the decoder of the base layer maybe the same as in the conventional art, so its descriptions are omitted.

Figure 1:
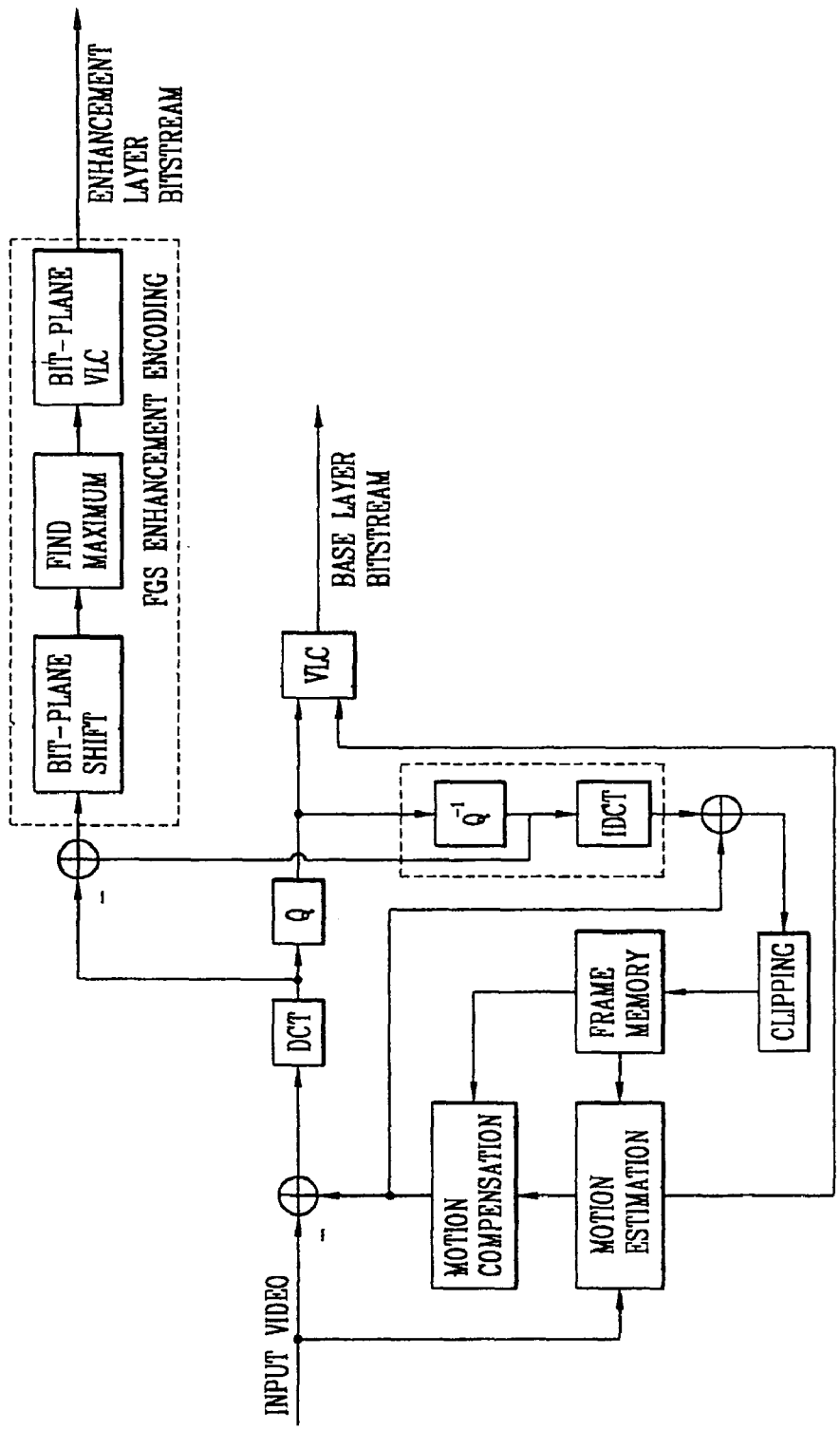
FIG. 1 is a schematic block diagram of a related-art FGS encoder.
Figure 2:
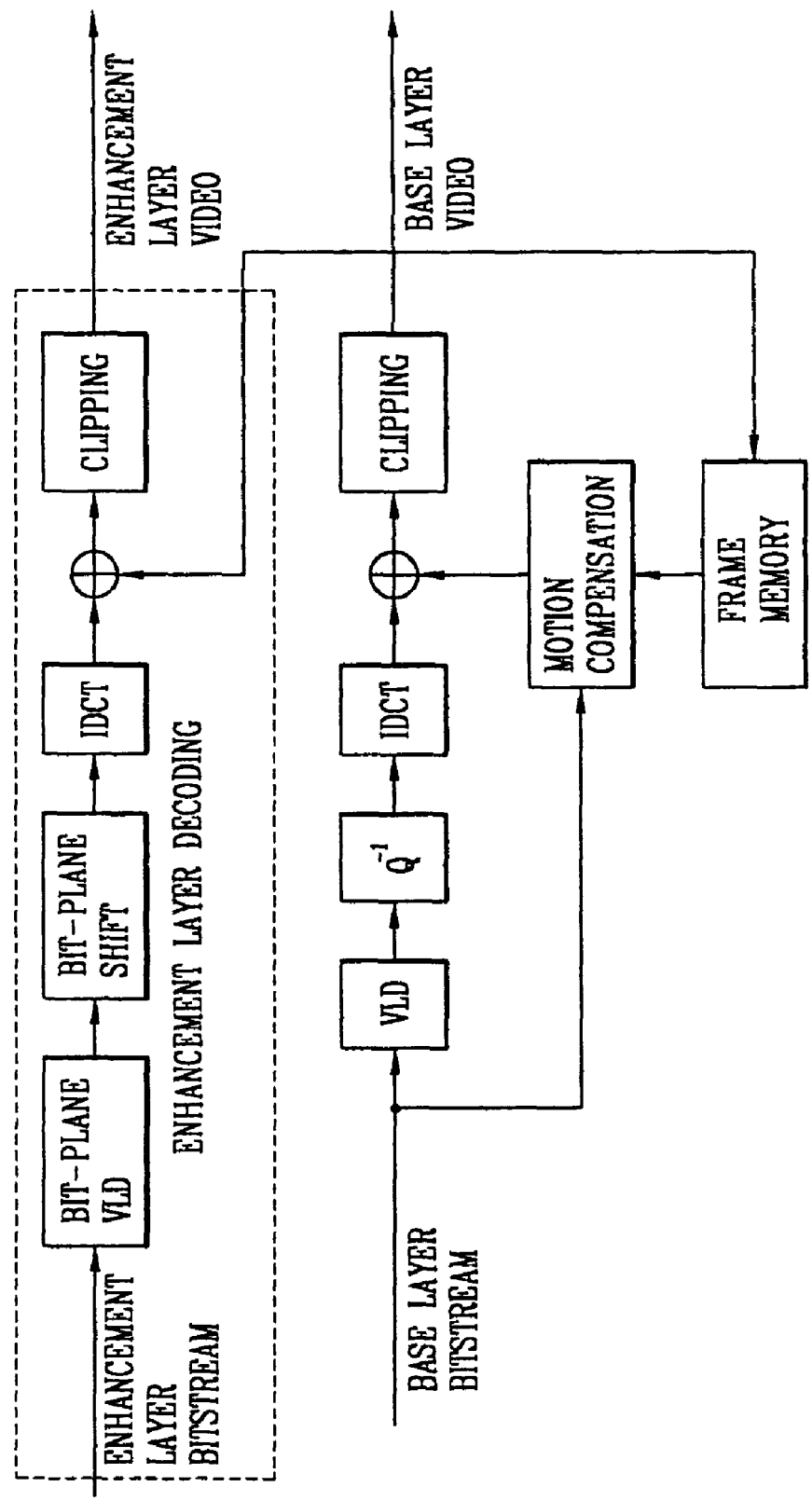
FIG. 2 is a schematic block diagram of a related-art decoder compatible with the FGS encoder.

Basically, as shown in FIG. 2, in the MPEG-4 FGS decoder, the signal of the enhancement layer and the signal of the base layer are added in a space region, not in the discrete cosine transform region. As a result, an inconsistency can exist between the encoder and decoder due to the clipping. In order to solve this problem, in the decoder of the present invention, the signal of the enhancement layer and the signal of the base layer maybe added in the DCT region.

In the encoder of the present invention, the sign of the enhancement signal is the same as that of the base layer except when the signal value of the base layer is 0, so the sign information of signal of the enhancement layer is not transmitted. In this respect, however, because there is no sign information to be referred when the value of the signal of the base layer is 0, sign information of 1 bit is insertedly added to a corresponding codeword of the signal of the enhancement layer.

The decoder decodes the signal of the base layer and then the signal of the enhancement layer. At this time, the sign information of the enhancement layer signal is decoded to be the same as the sign of the base layer signal. When a value of the base layer signal is 0, an accurate sign is obtained from the 1 bit sign information after the corresponding codeword of the enhancement layer signal and then decoded.

When the signal of the enhancement layer is generated in the encoder, the quantization error is determined based on a difference involving the decision level, not the re-construction value. As a result, a value of the difference between the reconstruction value and the decision level (value) is corrected before the signal of the base layer and the signal of the enhancement layer are added in the decoder.

As so far described, the fine granularity scalability encoding/decoding apparatus and method of the present invention have at least the following advantages. Because the sign of the enhancement layer and the sign of the base layer are generated to be the same, sign information is not needed to be transmitted. Thus, coding efficiency can be improved and a bit rate of the overall coding stream can be reduced.

In addition, in the FGS encoding method for a moving picture streaming in a wired/wireless network, more efficient performance is obtained than in the MPEG-4 FGS encoding method of the related-art. Moreover, by using the coding method with a hierarchy structure, an efficiency in an error-resistance transmission of moving picture information can be heightened.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A fine granularity scalability encoding apparatus, comprising:
   a first quantizer which quantizes a resulting DCT value from a motion-compensated image;

a second quantizer which re-quantizes the value obtained by the first quantizer;

an inverse-quantizer which inverse quantizes a value re-quantized by the second quantizer;

a first subtracter which obtains a difference between a value of N times the re-quantized value and the inverse-quantized value;

a second subtracter which obtains a difference between the value quantized by the first quantizer and the value quantized by the inverse-quantizer; and a third subtracter which subtracts an output value of the first subtracter from an output value of the second subtracter.

2. The apparatus of claim 1, further comprising:
a bit plane shifting unit which performs bit plane shifting if a block with a good picture quality is required.

3. The apparatus of claim 1, further comprising:
a maximum value calculating unit which searches a maximum value from output values of the third subtracter; and
a bit plane variable length coding unit which performs variable length coding on the obtained maximum value by bit planes.

4. A fine granularity scalability encoding apparatus, comprising:
a first quantizer which quantizes a resulting DCT value from a motion-compensated image;
a second quantizer which re-quantizes the value obtained by the first quantizer;
an inverse-quantizer which inverse quantizes a value re-quantized by the second quantizer;
re-inverse-quantizer which re-inversely quantizes the value inversely quantized by the inverse-quantizer; and
a subtracter which obtains a difference between the value quantized by the first quantizer and a value equal to N times the value quantized by the second quantizer.

5. The apparatus of claim 4, further comprising:
a bit plane shifting unit which performs a bit plane shift if a block with a good picture quality is necessary.

6. The apparatus of claim 4, further comprising:
a maximum value calculating unit which searches a maximum value from output values of the third subtracter; and
a bit plane variable length coding unit which performs variable length coding on the obtained maximum value by bit planes.

7. A fine granularity scalability decoding apparatus, comprising:
a bit plane variable length decoding (VLD) unit which performs variable-length decoding of an enhancement layer bit stream by bit planes;
an adding/subtracting unit which adds/subtracts a difference value between the variable length decoded value of each bit plane and an image reproduced in the base layer;
an inverse-quantizer which inversely quantizes the added/subtracted value;
an inverse discrete cosine transforming unit which restores an image transmitted from the enhancement layer by performing an inverse discrete cosine transforming (IDCT) on the inversely quantized value by block units; and
a clipping unit which restores an enhanced image by clipping the inverse discrete cosine transformed image values in the range of 0~255.

8. The apparatus of claim 7, wherein the adding/subtracting unit comprising:

a fifth subtracter which obtains a difference value ($\Delta k$) between a value equal to N times the value obtained by variable length decoding the bit stream of the base layer and a value obtained by inversely quantizing the variable length decoded value;

a sixth subtracter which obtains a difference value between the value obtained by the fifth subtracter and the bit plane variable length decoded value; and a seventh subtracter which obtains a difference value between a value obtained by the sixth subtracter and the value inversely quantized by the inverse-quantizer.

9. A fine granularity scalability encoding method, comprising:
quantizing a value obtained by performing a discrete cosine transforming on a motion-compensated image;
re-quantizing the quantized value;
inverse-quantizing the re-quantized value;
obtaining a difference between a value of N times the re-quantized value and the inverse-quantized value;
obtaining a difference between the first-quantized value and the inverse-quantized value; and
subtracting output values obtained in the obtaining steps.

10. The method of claim 9, further comprising:
finding a maximum value from output values obtained in the subtracting step; and
performing variable length coding on the calculated maximum value by bit planes.

11. A fine granularity scalability encoding method, comprising
quantizing a value obtained by performing a discrete cosine transforming on a motion-compensated image;
re-quantizing the quantized value;
inversely quantizing the re-quantized value;
inversely quantizing the inversely quantized value;
obtaining a difference between the first-quantized value and a value equal to N times the requantized value.

12. The method of claim 11, further comprising:
finding a maximum value from the output values obtained in the obtaining step; and
performing variable length coding on the calculated maximum value by bit planes.

13. A fine granularity scalability decoding method comprising:
variable-length decoding an enhancement layer bit stream by bit planes;
adding/subtracting a difference value between the variable length decoded value of each bit plane and an image reproduced in a base layer;
inversely quantizing the added/subtracted value;
restoring an image transmitted from the enhancement layer by performing an inverse discrete cosine transforming (IDCT) on the inversely quantized value by block units; and
restoring an enhanced image by clipping the inverse discrete cosine transformed image values in the range of 0~255.

14. The method of claim 13, wherein the step of adding/subtracting comprises:
obtaining a difference value between a value equal to N times the value obtained by variable length decoding the bit stream of the base layer and the value obtained by inversely quantizing the variable length decoded value;

obtaining a difference value between the value obtained by the first obtaining step and the bit plane variable length decoded value; and obtaining a difference value between the value obtained in the second obtaining step and the inversely quantized value.

* * * * *